United States Patent [19]

Chang

[11] Patent Number: 5,006,500

[45] Date of Patent: Apr. 9, 1991

[54] OLEFIN POLYMERIZATION CATALYST FROM TRIALKYLALUMINUM MIXTURE, SILICA GEL AND A METALLOCENE

[75] Inventor: Main Chang, Houston, Tex.

[73] Assignee: Exxon Chemical Patents Inc., Linden, N.J.

[21] Appl. No.: 422,357

[22] Filed: Oct. 16, 1989

Related U.S. Application Data

[63] Continuation-in-part of Ser. No. 263,572, Oct. 27, 1988, Pat. No. 4,937,217, which is a continuation-in-part of Ser. No. 134,413, Dec. 17, 1987, Pat. No. 4,912,075.

[51] Int. Cl.$^5$ .............................................. C08F 4/656
[52] U.S. Cl. .................................... 502/107; 502/110; 502/111; 502/117; 502/120; 526/129
[58] Field of Search ............... 502/103, 107, 110, 117, 502/120, 111

[56] References Cited

U.S. PATENT DOCUMENTS 4,431,788  2/1984  Kaminsky ........................... 527/313

FOREIGN PATENT DOCUMENTS

| | | |
|---|---|---|
| 220436 | 9/1956 | Australia . |
| 0035242 | 2/1981 | European Pat. Off. . |
| 170059 | 6/1986 | European Pat. Off. ............ 502/117 |
| 2608863 | 9/1977 | Fed. Rep. of Germany . |
| 2608933 | 9/1977 | Fed. Rep. of Germany . |
| 3240382 | 5/1984 | Fed. Rep. of Germany . |

*Primary Examiner*—Patrick P. Garvin
*Attorney, Agent, or Firm*—M. B. Kurtzman

[57] ABSTRACT

A high activity alumoxane-metallocene supported catalyst for the polymerization of 1-olefins prepared by reacting undehydrated silica gel with a mixture of trimethylaluminum and triisobutylaluminum to produce a silica-alumoxane product which is then reacted with a Group IVB and/or Group VB metallocene to produce an active catalyst which may be obtained in powder form, suitable for use in gas or slurry phase reactors, by a removal of solvents and drying.

9 Claims, No Drawings

OLEFIN POLYMERIZATION CATALYST FROM TRIALKYLALUMINUM MIXTURE, SILICA GEL AND A METALLOCENE

This application is a continuation-in-part of copending application U.S. Ser. No. 263,572 filed Oct. 27, 1988 and now U.S. Pat. No. 4,937,217 which is in turn a continuation-in-part of U.S. application Ser. No. 134,413 filed Dec. 17, 1987 and now U.S. Pat. No. 4,912,075.

BACKGROUND OF THE INVENTION

1. Field of the Invention

This invention relates to a supported metallocene-alumoxane catalyst and a process for preparing this catalyst for use in polymerization of olefins and especially in the gas phase or liquid phase polymerization of olefins. The invention particularly relates to the substitution of triisobutylaluminum for trimethylaluminum in the production of those metallocene-alumoxane catalysts which are supported on silica gel containing from about 6 to about 20 percent by weight adsorbed water. The resulting material is dried to a free-flowing powder to yield a supported catalyst which is active for the homo or copolymerization of polymerizable-olefins.

2. Background to the Invention

Olefin polymerization catalysts comprising a metallocene and an aluminum alkyl component were first proposed in about 1956. Australian patent No. 220436 proposed for use as a polymerization catalyst a bis-(cyclopentadienyl) titanium, zirconium, or vanadium salt as reacted with a variety of halogenated or unhalogenated aluminum alkyl compounds. Although capable of catalyzing the polymerization of ethylene, such catalytic complexes, especially those made by reaction with a trialkyl aluminum, had an insufficient level of catalytic activity to be employed commercially for production of polyethylene or copolymers of ethylene.

Later it was found that certain metallocenes such as bis-(cyclopentadienyl) titanium, or zirconium dialkyls in combination with aluminum alkyl/water cocatalyst formed catalyst systems for the polymerization of ethylene. Such catalysts are discussed in German Patent Application No. 2,608,863 which discloses a polymerization catalyst for ethylene consisting of bis-(cyclopentadienyl) titanium dialkyl, trialkyl aluminum and water. German Patent Application No. 2,608,933 discloses an ethylene polymerization catalyst consisting of a cyclopentadienyl zirconium salt, a trialkyl aluminum cocatalyst and water. European Patent Application No. 0035242 discloses a process for preparing ethylene and atactic propylene polymers in the presence of a cyclopentadienyl transition metal salt and an alumoxane. Such catalysts have sufficient activity to be commercially useful and enable the control of polyolefin molecular weight by means other than hydrogen addition—such as by controlling the reaction temperature or by controlling the amount of cocatalyst alumoxane as such or as produced by the reaction of water with an aluminum alkyl.

To realize the benefits of such catalyst systems, one must use or produce the required alumoxane cocatalyst component. An alumoxane is produced by the reaction of an aluminum alkyl with water. The reaction of an aluminum alkyl with water is very rapid and highly exothermic. Because of the extreme violence of the reaction the alumoxane cocatalyst component has, heretofore, been separately prepared by one of two general methods. Alumoxanes may be prepared by adding an extremely finely divided water, such as in the form of a humid solvent, to a solution of aluminum alkyl in toluene or other aromatic hydrocarbons. The production of an alumoxane by such procedure requires use of explosion-proof equipment and very close control of the reaction conditions in order to reduce potential fire and explosion hazards. Also, fine solid particles are generated in the head space of the reactor which can plug the vent and the transfer tube and cause the shut down of the process. For this reason, it has been preferred to produce alumoxane by reacting an aluminum alkyl with a hydrated salt, such as hydrated copper sulfate. In such procedure a slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by a hydrated salt method significantly reduces the explosion, fire hazard, and fine generation inherent in the wet solvent production method, production of an alumoxane by reaction with a hydrated salt must be carried out as a process separate from that of producing the metallocene-alumoxane catalyst itself, is slow, and produces hazardous wastes that create disposal problems. Further, before the alumoxane can be used for the production of an active catalyst complex the hydrated salt reagent must be separated from the alumoxane to prevent it from becoming entrained in the catalyst complex and thus contaminating any polymer produced therewith.

U.S. Pat. No. 4,431,788 discloses a process for producing a starch filled polyolefin composition wherein a trialkyl aluminum is first reacted with starch particles. The starch particles are then treated with a (cyclopentadienyl)-chromium, titanium, vanadium or zirconium alkyl to form a metallocene-alumoxane catalyst complex on the surface of the starch particles. An olefin is then polymerized about the starch particles by solution or suspension polymerization procedures to form a free-flowing composition of polyolefin-coated starch particles. German Patent No. 3,240,382 likewise discloses a method for producing a filled polyolefin composition which utilizes the water content of an inorganic filler material to directly react with a trialkyl aluminum and produce thereon an active metallocene alumoxane catalyst complex. Polymer is produced by solution or gas phase procedures at the filler surface to uniformly coat the filler particles and provide a filled polymer composition.

German Patent No. 3,240,382 notes that the activity of a metallocene-alumoxane catalyst is greatly impaired or lost when prepared as a surface coating on an inorganic material. Although German Patent No. 3,240,382 suggests that an inorganic material containing absorbed or adsorbed water may be used as a filler material from which the alumoxane cocatalyst component may be prepared by direct reaction with a trialkyl aluminum, the only water containing inorganic filler materials which are identified as capable of producing the alumoxane without adversely affecting the activity of the metallocene alumoxane catalyst complex are certain inorganic materials containing water of crystallization or bound water, such as gypsum or mica. German Patent No. 3,240,382 does not illustrate the production of a catalyst coated inorganic filler material wherein the inorganic material is one having absorbed or adsorbed water. Nor does German Patent No. 3,240,382 describe an inorganic filler material having absorbed or adsorbed water which has surface area or pore volume properties suitable for service as a catalyst support for a gas phase polymerization procedure. All these publications also teach that only methylalumoxane formed by reacting trimethylaluminum with water, has high enough activity for polyolefin polymerization. Other trialkyl aluminum compounds do not form high activity alumoxane when react with water.

My copending U.S. patent application Ser. No. 134,413, now U.S. Pat. No. 4,912,075 discloses a method by which the requisite alumoxane cocatalyst component for a supported metallocene gas phase polymerization catalyst may be safely and economically prepared by addition of an "undehydrated" silica gel to a trialkyl aluminum solution. My co-pending application illustrates the production of highly active silica gel supported metallocene-alumoxane catalyst wherein trimethylaluminum is utilized to form the alumoxane. Although the reaction product of triethylaluminum with water is known to form an ineffective cocatalyst, a highly active catalyst system is formed in accordance with the method disclosed in my co-pending application Ser. No. 268,834, now U.S. Pat. No. 4,925,821 by reacting triethylaluminum with undehydrated silica gel followed by reacting with metallocene.

My copending U.S. application Ser. No. 263,572 teaches the use of a mixture of TEAL and TMA to produce the alumoxane component of a metallocene-alumoxane catalyst in a less expensive process than the use of TMA alone. The use of this TEAL/TMA mixture produces an alumoxane which, in combination with a metallocene, provides a catalyst more active for olefin polymerization than those metallocene-alumoxane catalysts using only TEAL. Furthermore, it has been found that the TEAL/TMA mixture-based metallocene-alumoxane catalyst reduces the amount of solid waste particles that accumulate in the head space of reactors thereby eliminating or reducing vent-line plugging and costly reactor down time. The TEAL in the mixture also tends to reduce the violence of the reaction produced when TMA alone is contacted with water to produce an alumoxane component. Thus, the TEAL/TMA based catalysts provide high activity, lower cost catalysts which are safer to produce and which offer reduced operating costs due to lower reactor down times.

Despite the activity and cost improvements already achieved in processes for polymerizing olefins using metallocene-mixed alumoxane catalysts, it is yet desirable to produce even higher activity catalysts.

SUMMARY OF THE INVENTION

The invention provides a supported metallocene-alumoxane catalyst effective for the homo or copolymerization of olefins. The alumoxane cocatalyst component is formed by reacting a mixture of triisobutylaluminum (TIBA) and trimethylaluminum (TMA) with undehydrated silica gel. The metallocene component, which is selected from the metallocenes of the Group IVB and/or VB metals, is then added to the trialkylaluminum-silica gel complex to form the active supported catalyst. Solvents used in the preparation of the catalyst may be evaporated to produce a dry catalyst in powder form useful in gas or slurry phase 1-olefin polymerization. It has been surprisingly discovered that by replacing TEAL with equivalent amounts of TIBA obtains a more active catalyst for the polymerization of olefins.

As the catalyst support, this invention utilizes silica particles having a surface area in the range of about 10 m/g to about 700 m/g, preferably about 100–500 m/g and desirably about 200–400 m/g, a pore volume of about 3 to about 0.5 cc/g and preferably 2–1 cc/g and an adsorbed water content of from about 6 to about 20 weight percent, preferably from about 9 to about 15 weight percent.

The novel silica gel supported metallocene-alumoxane catalyst is prepared by adding the undehydrated silica gel to a stirred solution of a mixture of TIBA and TMA in an amount sufficient to provide a mole ratio of TIBA plus TMA to water of from about 3:1 to about 1:2, preferably 1.2:1 to about 0.8:1; thereafter mixing this stirred solution with a metallocene in an amount sufficient to provide an aluminum to transitional metal ratio of from about 1000:1 to 1:1, preferably from about 300:1 to 10:1, most preferably from about 150:1 to about 30:1; removing the solvent and drying the solids to a free-flowing powder. Drying can be obtained by modest heating or vacuum.

The dried, free-flowing powder comprises a metallocene-alumoxane catalyst complex adsorbed upon the surface of the silica gel support particles. The supported catalyst complex has an activity sufficient for use as a catalyst for polymerization of olefins by conventional gas or slurry phase polymerization procedures.

This invention further provides for the use of TIBA to produce a substantial portion of the alumoxane cocatalyst component required to produce a highly active supported metallocene-alumoxane catalyst. The undehydrated silica gel support material is added to a stirred solution of TMA and TIBA, the mole ratio of TMA:TIBA in common solution being from about 1:1 to about 10,000:1 preferably 2:1 to about 1000:1 and the mole sum of TMA and TIBA being selected to provide a mole ratio of Al to transition metal in the final catalyst composition of from about 1000:1 to about 1:1. Thereafter, the metallocene is added to the stirred solution after which the solvent is removed and the solids dried to a free-flowing powder.

DETAILED DESCRIPTION OF THE PREFERRED EMBODIMENTS

The present invention is directed toward a supported catalyst system for use in polymerization of olefins and especially in the gas or slurry phase homo and copolymerization of olefins. The supported catalyst is particularly useful for the gas phase copolymerization of ethylene to high molecular weight polyethylenes such as linear low density polyethylene (LLDPE) and high density polyethylene (HDPE). The novel catalyst complex is particularly suitable for the production of the homopolymers of ethylene and copolymers of ethylene with higher alpha-olefins and diolefins having from 3 to about 10 carbon atoms and preferably 3 to 8 carbon atoms. Illustrative of the olefins are butene-1, hexene-1, octene-1, 3-methylpentene-1, 4-methylpentene-1, 1,4-hexadiene, 1,4-pentadiene, 1,3-butadiene, 4-methyl-1,4-pentadiene, 1,5-heptadiene, 1,4-heptadiene.

In the process of the present invention, a 1-olefin or a mixture of 1-olefins is polymerized in the presence of a silica gel supported catalyst system comprising at least one metallocene and an alumoxane produced from reacting a mixture of TIBA and TMA with the water contained in an undehydrated silica gel.

The invented catalyst system includes a metallocene and an alumoxane cocatalyst formed onto the surface of a silica gel support material.

Alumoxanes are oligomeric aluminum compounds represented by the general formula $(R-Al-O)_y$ which is believed to be a cyclic compound and $R(R-Al-O-)_yAlR$, which is a linear compound. In the general formula, "R" is a C—C alkyl group such as, for example, methyl, ethyl, propyl, butyl, and pentyl and "y" is an integer from 2 to about 30 and represents the degree of oligomerization of the alumoxane. Preferably, the degree of oligomerization, "y", is about 4 to about 25 and most preferably 6-25. Generally, in the preparation of alumoxanes from, for example, the reaction of trimethyl aluminum and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of a trialkyl aluminum with an undehydrated silica gel should insure the conversion of the bulk quantity of the trialkyl aluminum to an alumoxane having a high degree of oligomerization. In accordance with this invention the desired degree of oligomerization is obtained by the order of addition of reactants as described hereinafter.

The metallocene may be any of the organometallic coordination compounds obtained as a cyclopentadienyl derivative of the Group IVB and/or Group VB transition metals. Metallocenes which are useful for preparing an active catalytic complex according to the process of this invention are the mono, bi and tri cyclopentadienyl or substituted cyclopentadienyl metal compounds and most preferably, bi-cyclopentadienyl compounds. The metallocenes particularly useful in this invention are represented by the general formulas:

$(Cp)_mMR_nX_q$      (I)

wherein Cp is a cyclopentadienyl ring, M is a Group IVB or VB transistion metals and preferably a Group IVB transition metal, R is a hydrogen, hydrocarbyl group, or hydrocarboxy group having from 1 to 20 carbon atoms, X is a halogen, and "m" is a whole number from 1 to 3, "n" is a whole number form 0 to 3, and "q" is a whole number from 0 to 3, with $m+n+q=4$

$(C_5R'_k)_gR''_s(C_5R'_k)MQ_{3-g}$ and      (II)

$R''_s(C_5R'_k)_2MQ'$      (III)

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4$-$C_6$ ring, R" is $C_1$-$C_4$ alkylene radical, a dialkyl germanium or silicone, or an alkyl phosphine or amine radical bridging two $(C_5R'_k)$ rings, Q is a hydrogen, hydrocarbyl radical such as aryl, alkyl, alkenyl, alkylaryl, or arylalkyl having 1-20 carbon atoms, hydrocarboxy radical having 1-20 carbon atoms or halogen and can be the same or different, Q' is an alkylidene radical having from 1 to about 20 carbon atoms, s is 0 or 1, g is 0, 1 or 2; when g is 0, s is 0; k is 4 to 0 when s is 1 and k is 5 to 0 when s is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, hafnocenes, zirconocenes and titanocenes are most preferred. Illustrative but non-limiting examples of the metallocenes which can be usefully employed in accordance with this invention are monocyclopentadienyl titanocenes such as, cyclopentadienyl titanium trichloride, pentamethylcyclopentadienyl titanium trichloride; bis(cyclopentadienyl) titanium diphenyl; the carbene represented by the formula $Cp_2Ti=CH_2 \cdot Al(CH_3)_2Cl$ and derivatives of this reagent such as $Cp_2Ti=CH_2 \cdot Al(CH_3)_3$, $(Cp_2TiCH_2)_2$, $Cp_2TiCH_2CH(CH_3)CH_2$, $Cp_2Ti=CHCH_2CH_2 \cdot AlR'''_2Cl$, wherein Cp is a cyclopentadienyl or substituted cyclopentadienyl radical, and R''' is an alkyl, aryl, or alkylaryl radical having from 1-18 carbon atoms; substituted bis(Cp)Ti(IV) compounds such as bis(indenyl)Ti dimethyl, dihalide, or methyl halide, bis(methylcyclopentadienyl)Ti dimethyl, dihalides, methyl halide, or other dialkyl or alkyl halide complexes; dialkyl, trialkyl, tetra-alkyl and penta-alkyl cyclopentadienyl titanium compounds such as bis(1,2-dimethylcyclopentadienyl)Ti dimethyl, diphenyl, dichloride, methyl chloride, or phenyl chloride, bis(1,2-diethylcyclopentadienyl)Ti dimethyl, diphenyl, dichloride, methyl chloride, phenyl chloride, or other dialkyl, alkyl halide or aryl halide complexes; silicone, phosphine, amine or carbon bridged cyclopentadiene complexes, such as dimethyl silyldicyclopentadienyl titanium dimethyl, diphenyl, or dichloride, methylenedicyclopentadienyl titanium dimethyl, diphenyl, dihalide, or other dialkyl, diaryl, alkyl halide, or aryl halide complexes.

Illustrative but non-limiting examples of the zirconocenes which can be usefully employed in accordance with this invention are, cyclopentadienyl zirconium trichloride, pentamethylcyclopentadienyl zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis(-phenylpropyl-cyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethylcyclopentadienyl)zirconium dimethyl, bis(1,2-dimethylcyclopentadienyl)zirconium dimethyl, bis(1,3-diethylcyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride bis(n-butylcyclopentadienyl) hafnium dichloride, or dimethyl, bis(methylcyclopentadienyl) hafnium dichloride, or dimethyl, bis(indenyl)hafnium dichloride, or dimetnyl and the like are illustrative of other metallocenes.

Generally the use of a metallocene which comprises a bis(substituted cyclopentadienyl) zirconium will provide a catalyst complex of higher activity than a corresponding titanocene or a mono cyclopentadienyl metal compound. Hence, bis(substituted cyclopentadienyl) zirconium compounds are preferred for use as the metallocene.

The alumoxane component of the invention catalyst complex is prepared by direct reaction of a TMA and TIBA mixture with the material utilized as the catalyst support, namely an undehydrated silica gel. Silica useful as the catalyst support is that which has a surface area in the range of about 10 to about 700 m$^2$/g, preferably about 100–500 and desirably about 200–400 m$^2$/g, a pore volume of about 3 to about 0.5 cc/g and preferably 2–1 cc/g, and an adsorbed water content of from about 6 to about 20 weight percent, preferably from about 9 to about 15 weight percent. The average particle size (APS) of the silica may be from about 0.3$\mu$ to about 100$\mu$, and for a gas phase catalyst preferably from about 30$\mu$ to about 80$\mu$ (1$\mu$=10$^{-6}$ m). For a catalyst intended for high pressure polymerization (10,000 to 30,000 psig) the particle size of the silica should range from about 0.3 to no greater than about 10. Silica having the above identified properties is referred to as "undehydrated silica gel."

To produce the invention catalyst, undehydrated silica gel is added over time, about a few minutes to one hour, to a stirred solution of a mixture of TMA and TIBA, in an amount sufficient to provide a mole ratio of trialkyl aluminum to water of from about 3:1 to 1:2, preferably about 1.2:1 to 0.8:1. The temperature of reaction is from −196° C. to 150° C.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like. The less toxic aliphatic hydrocarbon solvents are preferred.

Upon addition of the undehydrated silica gel to the solution of TIBA and TMA in an inert solvent, the water content of the silica gel controllably reacts with the TMA and TIBA to produce an alumoxane which is deposited onto the surface of the silica gel particles. Although the reaction of the TIBA and TMA with the water content of the silica gel proceeds relatively quickly, that is, it is generally completed within the time of about 5 minutes, it does not occur with the explosive quickness of that which occurs with free water. The reaction may be safely conducted in conventional mixing equipment under a mantle of inert gas.

After the TMA/TIBA mixture has been reacted with the water contained in the undehydrated silica gel, and the alumoxane formed, a Group IVB and/or VB metallocene or mixture of such metallocene is added to the stirred suspension of alumoxane-silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature to permit the metallocene to undergo complete reaction with the adsorbed alumoxane.

Upon completion of the metallocene-alumoxane reaction, the solvent is removed and the residual solids are dried, preferably at a temperature of 25° C. or greater, to a free-flowing powder. The free-flowing powder comprises a silica gel-supported metallocene-alumoxane catalyst complex of sufficiently high catalytic activity for use in the polymerization of olefins by conventional gas or slurry phase polymerization procedures.

The order of addition of the undehydrated silica gel to the TIBA and TMA solution is important and directly impacts the activity of the resultant supported catalyst when the metallocene is added. A supported catalyst composition of little or no activity results when the TMA and TIBA solution is added to a stirred suspension of undehydrated silica gel in a solvent. It has been found that to prepare a supported catalyst composition of acceptable or high activity the order of mixing must be one wherein the undehydrated silica gel is added to a stirred solution of TIBA and TMA. It has been found that under mixing conditions which slowly add undehydrated silica gel to a stirred solution of TIBA and TMA, the bulk content of the trialkyl aluminum converts to an alumoxane with a degree of oligomerization of about 6–25 (y=6–25). Production of an alumoxane with this degree of oligomerization results in a final metallocene alumoxane catalyst complex of useful or high activity. As mentioned before, a reverse order of mixing, that is, addition of a trialkyl aluminum to a stirred solvent suspension of undehydrated silica gel is not recommended and yields a catalyst which has a low degree of catalytic activity.

In addition to the importance of proper mixing order in achieving a supported catalyst of useful activity, it has also been observed that the water content of the undehydrated silica gel influences final catalyst activity. Hence, the undehydrated silica gel should have an adsorbed water content of from about 6 to about 20 weight percent. Preferably the adsorbed water content should be from about 9 to about 15 weight percent.

Further influencing the degree of activity attained in the final supported catalyst complex is the mole ratio of trialkyl aluminum (i.e. TMA plus TIBA) to the adsorbed water content of the undehydrated silica gel. The quantities of TMA plus TIBA employed should, in comparison to the quantity of undehydrated silica gel of specified adsorbed water content, be selected to provide a mole ratio of total trialkyl aluminum to water of from about 3:1 to about 1:2, preferably from about 1.5:1 to about 0.8:1, more preferably from about 1.2:1 to about 0.8:1. It has been observed that for a given metallocene, a maximum catalyst activity is generally observed in the TMA plus TIBA to water mole ratio range of about 1.2:1 to about 0.8:1. Depending upon the particular trialkyl aluminum selected for use, commercially acceptable catalyst activities are exhibited in the trialkyl aluminum to water mole ratio range of about 3:1 to about 1:2.

Also influencing the cost of production and the level of catalytic activity obtained in the final supported catalyst complex is the mole ratio of aluminum to transition metal of the metallocene component. The quantity of metallocene added to the alumoxane adsorbed onto the silica gel solids should be selected to provide an aluminum to transition metal mole ratio of from about 1000:1 to about 1:1, preferably from about 300:1 to about 10:1, and most preferably from about 150:1 to about 30:1. From the standpoint of economic considerations, it is desirable to operate in the lower ranges of the aluminum to transition metal mole ratio in order to minimize the cost of catalyst production. The procedure of this invention is one which provides the maximum conversion of the trialkyl aluminum component (i.e. the TMA and TIBA) to the most efficacious form of alumoxane, hence permiting the safe production of a supported metallocene alumoxane catalyst of useful activity with minimum quantities of the costly trialkyl aluminum component.

The present invention now provides a method by which substantial quantities of TIBA can be used in replacement of the more expensive TMA to produce a methyl alumoxane-butylalumoxane mixed cocatalyst component which, when combined with a Group IVB and/or Group VB metallocene or mixtures thereof, produces a final supported catalyst having a high degree of catalytic activity and surprisingly higher activity than catalyst produced from TEAL and TMA. In this embodiment of the invention, the trialkyl aluminum solution to which the undehydrated silica gel is added is a mixed solution of TMA and TIBA, in the mole ratio TMA:TIBA of from about 1:1 to about 10,000:1, in quantities sufficient to provide the amount of total aluminum necessary to achieve the mole ratio of Al to transition metal desired in the final supported catalyst composition.

By appropriate selection of the type and relative amounts of the Group IVB and/or Group VB metallocene and the relative quantities of TIBA and TMA in the cocatalyst precursor mixture, one can attain by the present method the particular active catalyst complex desired for a specific application. For example, higher concentrations of alumoxane in the catalyst system generally result in higher molecular weight polymer product. Therefore, when it is desired to produce a high molecular weight polymer a higher concentration of trialkyl aluminum is used, relative to the metallocene, than when it is desired to produce a lower molecular weight material. For most applications, the ratio of aluminum in the aluminum alkyl to total metal in the metallocene can be in the range of from about 300:1 to about 20:1, and preferably about 200:1 to about 50:1.

Following the addition of the metallocene to the alumoxane adsorbed on the silica gel solids, the catalyst is dried to a free-flowing powder. Drying of the catalyst may be conducted by filtration or evaporation of solvent at a temperature up to about 85° C. The dried free-flowing powder comprises a metallocene-alumoxane complex adsorbed upon the surface of the silica gel support particles. The dried state composition exhibits a level of catalytic activity useful for polymerization of olefins by a gas or slurry phase procedure as are known in the art.

As disclosed in copending application Ser. No. 728,111 filed Apr. 29, 1985, [all the metallocenes disclosed therein being usefully employed in this invention, said disclosure being incorporated herein by reference] the molecular weight of the polymer product can be controlled by the judicious selection of substituents on the cyclopentadienyl ring and use of ligands for the metallocene. Further, the comonomer content can be controlled by the judicious selection of the metallocene. Hence, by the selection of catalyst components it is possible to tailor the polymer product with respect to molecular weight and density. Further, one may tailor the polymerization reaction conditions over a wide range of conditions for the production of polymers having particular properties.

[In the examples following, the melt index (MI) and melt index ratio (MIR) were determined in accordance with ASTM test D1238.]

EXAMPLE 1

A catalyst was prepared by adding 90 ml of TIBA in a heptane (0.9M) solution, 160 ml of TMA in heptane (1.4M) solution, and 200 ml of heptane solvent to a dry and oxygen-free one-liter reactor equipped with a magnetic stirring bar. A 50 g of undehydrated silica gel (Davison 948) containing 12.8% of water was slowly added to the flask. After the addition was complete, the mixture was stirred at ambient temperature for one hour. A 1.25 g of di-(n-butylcyclopentadienyl)zirconium dichloride slurried in 50 ml of heptane was then added to the reactor and the mixture was allowed to react at ambient temperature for 30 minutes. The reactor was then heated to 65° C. while purging nitrogen gas through the flask to remove the solvent and produce a free-flowing powder.

EXAMPLE 2

Example 1 was repeated except that 130 ml of TIBA and 135 ml of TMA solution were added to the reactor to react with the undehydrated silica.

EXAMPLE 3

Example 1 was repeated except that 170 ml of TIBA and 110 ml of TMA solution were added to the reactor to react with the undehydrated silica.

EXAMPLE 4 (COMPARATIVE)

Example 1 was repeated except that 335 ml of TIBA solution was added to the reactor to react with the undehydrated silica.

EXAMPLE 5 (COMPARATIVE)

Example 1 was repeated except that 220 ml of TMA solution was added to the reactor to react with the undehydrated silica.

EXAMPLE 6 (COMPARATIVE)

Example 1 was repeated except that 60 ml of triethylaluminum (TEAL) (1.6M in heptane) and 140 ml of TMA solution were added to the reactor to react with the undehydrated silica which contained 12.3% water.

EXAMPLE 7 (COMPARATIVE)

Example 6 was repeated except that 120 ml of TEAL (1.6M in heptane) and 70 ml of TMA solution were added to the reactor to react with the undehydrated silica which contained 12.3% water.

EXAMPLE 8

Polymerization Using The Catalysts of Examples 1-7

The activity of the catalyst of Examples 1-7 was determined at ambient temperature and 5 psig ethylene pressure by the following procedure. A 150 ml vial containing a magnetic stirring bar was charged with 2.0 g of catalyst. Ethylene was fed into the vial at ambient temperature and a total pressure of 5 psig was maintained for 30 minutes. Thereafter, the residual ethylene gas was vented from the vial and the polyethylene formed inside the vial was weighed. The yield of polyethylene obtained with each catalyst is listed in Table 1.

TABLE I

| Catalyst Example | Amount PE Formed, g |
|---|---|
| 1 | 8.2 |
| 2 | 4.7 |
| 3 | 2.1 |
| 4 | 0.4 |
| 5 | 9.7 |
| 6 | 4.7 |
| 7 | 3.0 |

The invention has been described with reference to its preferred embodiments. From this description, a person of ordinary skill in the art may appreciate changes that could be made in the invention which do not depart from the scope and spirit of the invention as described above and claimed hereafter.

I claim:

1. A catalyst for the polymerization of 1-olefins comprising the reaction product of:
   (a) undehydrated silica gel;
   (b) a mixture of trimethyl aluminum and triisobutyl aluminum wherein the mole ratio of TMA to TIBA is from about 2:1 to about 1000:1; and
   (c) a metallocene component selected from the group consisting of Group IVB metallocenes, Group VB metallocenes and mixtures thereof.

2. The catalyst of claim 1 wherein the metallocene is a titanocene, zirconocene, hafnocene or mixtures thereof.

3. The catalyst of claim 1 wherein the water content of the undehydrated silica gel ranges from about 6 to about 20 wt. % based on the total weight of silica gel and water.

4. The catalyst of claim 1 wherein the metallocene is a titanocene, hafnocene, zirconocene, or mixtures thereof and the moisture content of the undehydrated silica is from about 6 wt. % to about 20 wt. % based on the total weight of the silica gel and water.

5. A method of preparing a catalyst active for the polymerization of 1-olefins, comprising:
   (i) reacting a mixture of triisobutyl aluminum and trimethyl aluminum wherein the mole ratio of TMA to TIBA is from about 2:1 to 1000:1 with an undehydrated silica gel to form a reaction product;
   (ii) contacting the reaction product with a metallocene component selected from the group consisting of Group IVB metallocenes, Group VB metallocenes and mixtures thereof to produce a catalytic composition.

6. The method of claim 5 further comprising removing solvents and drying the catalytic composition to produce a catalyst in powder form.

7. The method of claim 5 wherein the metallocene is a titanocene, zirconocene, hafnocene or mixtures thereof.

8. The method of claim 5 wherein the water content of the undehydrated silica gel ranges from about 6 to about 20 wt. % based on the total weight of silica gel and water.

9. The method of claim 5 wherein the metallocene is a titanocene, hafnocene, zirconocene, or mixtures thereof and the moisture content of the undehydrated silica is from about 6 wt. % to about 20 wt. % based on the total weight of the silica gel and water.

* * * * *